United States Patent
Wang (10) Patent No.: US 11,469,994 B2
(45) Date of Patent: Oct. 11, 2022

(54) METHOD FOR OBTAINING ROUTE SELECTION POLICY, METHOD FOR PERFORMING ROUTE SELECTION POLICY RULE, APPARATUS, DEVICE, AND COMPUTER-READABLE STORAGE MEDIUM

(71) Applicant: TENCENT TECHNOLOGY (SHENZHEN) COMPANY LIMITED, Guangdong (CN)

(72) Inventor: Tao Wang, Shenzhen (CN)

(73) Assignee: TENCENT TECHNOLOGV (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/183,452

(22) Filed: Feb. 24, 2021

(65) Prior Publication Data

US 2021/0184965 A1 Jun. 17, 2021

Related U.S. Application Data

(63) Continuation of application No. PCT/CN2019/114182, filed on Oct. 30, 2019.

(30) Foreign Application Priority Data

Nov. 23, 2018 (CN) .......................... 201811410407.6

(51) Int. Cl.
- H04L 45/302 (2022.01)
- H04L 45/42 (2022.01)
- H04W 40/20 (2009.01)

(52) U.S. Cl.
CPC .......... *H04L 45/306* (2013.01); *H04L 45/308* (2013.01); *H04L 45/42* (2013.01); *H04W 40/20* (2013.01)

(58) Field of Classification Search
CPC ..... H04L 45/306; H04L 45/308; H04L 45/42; H04W 40/20
See application file for complete search history.

(56) References Cited

U.S. PATENT DOCUMENTS

| 2013/0343269 A1 | 12/2013 | Evans et al. |
| 2014/0040504 A1* | 2/2014 | Gupta ................ H04N 21/2385 709/244 |

(Continued)

FOREIGN PATENT DOCUMENTS

| CN | 101048012 A | 10/2007 |
| CN | 101296169 A | 10/2008 |

(Continued)

OTHER PUBLICATIONS

Chinese Office Action issue in CN 201811410407.6 dated Dec. 31, 2019.

(Continued)

*Primary Examiner* — Mohamed A. Wasel
*Assistant Examiner* — Jihad K Boustany
(74) *Attorney, Agent, or Firm* — Sughrue Mion, PLLC (57) ABSTRACT

Provided are a method for obtaining a route selection policy, a method for performing a route selection policy rule, an apparatus, a device and a computer-readable storage medium therefor. The method includes: generating a route selection policy rule for a terminal; transmitting an application function response to an application function network element after generation of the route selection policy rule for the terminal; and providing, to the terminal, the route selection policy rule, wherein the route selection policy rule includes at least one of a valid time or a valid location, the valid time representing a time at which the route selection (Continued)

policy rule is applicable, and the valid location representing a geographical location at which the route selection policy rule is applicable.

18 Claims, 5 Drawing Sheets

(56) References Cited

U.S. PATENT DOCUMENTS

| | | | | |
|---|---|---|---|---|
| 2014/0056214 | A1* | 2/2014 | Jorgensen | H04L 45/30 370/328 |
| 2015/0039784 | A1* | 2/2015 | Westphal | H04L 45/42 709/240 |
| 2016/0211988 | A1* | 7/2016 | Lucas | H04L 45/22 |
| 2018/0115483 | A1* | 4/2018 | Onno | H04L 47/20 |
| 2019/0230038 | A1* | 7/2019 | Hughes | H04L 43/20 |
| 2019/0394279 | A1* | 12/2019 | Dao | H04L 67/14 |
| 2021/0037380 | A1* | 2/2021 | Lee | H04W 68/00 |
| 2021/0385724 | A1* | 12/2021 | Wang | H04L 41/40 |

FOREIGN PATENT DOCUMENTS

| | | |
|---|---|---|
| CN | 109286567 A | 1/2019 |
| JP | 2010-533418 A | 10/2010 |

OTHER PUBLICATIONS

International Search Report for PCT/CN2019/114182 dated Dec. 25, 2019 (PCT/ISA/210).
Written Opinion for PCT/CN2019/114182 dated Dec. 25, 2019 (PCT/ISA/237).
Huawei et al., "Update and clarification of AF influence on traffic routing", 3GPP TSG SA WG2 Meeting #124, S2-179557, Nov. 17-Dec. 1, 2017, Reno, US (7 pages total).
"5G; Policy and Charging Control Framework for the 5G System; Stage 2 (3GPP TS 23.503 version 15.3.0 Release 15)", ETSI TS 123 503 V15.3.0, Sep. 2018 (73 pages total).
Extended European Search Report dated Feb. 4, 2022 from the European Patent Office in EP application No. 19888035.3.
Communication dated Feb. 22, 2022 from the European Patent Office in EP application No. 19888035.3.
Communication dated May 24, 2022 from the Japanese Patent Office in Application No. 2021-524138.
Nokia et al, "Completing the specification of USRP", 3GPP TSA WG2 Meeting #S2-124, Nov. 27-Dec. 1, 2017, Reno, Nevada, USA, S2-178508, 15 pages total.
Motorola Mobility et al., "Efficient delivery of UE Policies", 3GPP TSG SA WG2 Meeting #S2-129, S2-1811498, Oct. 15-Oct. 19, 2018, Dongguan, P.R. China, 11 pages total.
Huawei et al., "Solutions for common IMS network through multiple 5GC network slices", 3GPP TSG SA WG2 Meeting #127, Apr. 16-20, Sanya, China, S2-183367, 17 pages total.

* cited by examiner

METHOD FOR OBTAINING ROUTE SELECTION POLICY, METHOD FOR PERFORMING ROUTE SELECTION POLICY RULE, APPARATUS, DEVICE, AND COMPUTER-READABLE STORAGE MEDIUM

CROSS-REFERENCE TO RELATED APPLICATION(S)

This application is a bypass continuation application of International Application No. PCT/CN2019/114182, filed on Oct. 30, 2019, which claims priority to Chinese Patent Application No. 2018114104076, entitled "METHOD FOR OBTAINING ROUTE SELECTION POLICY, APPARATUS, AND DEVICE" and filed with the National Intellectual Property Administration, PRC on Nov. 23, 2018, the disclosures of which are herein incorporated by reference in their entireties.

FIELD

The disclosure relates to the field of communication, and in particular, to a method for obtaining a route selection policy, a method for performing a route selection policy rule, and an apparatus, a device and a computer-readable storage medium therefor.

BACKGROUND

The 5th generation mobile communication (5G) system is also referred to as a new radio (NR) system. In the current third generation partnership project technical specification (3GPP TS) 23.503, user equipment (UE) route selection policy (URSP) rules are provided.

UE determines, by using a URSP rule, how to route outgoing traffic. The UE may route the traffic to an established protocol data unit (PDU) session, or may offload the traffic to non-3GPP access outside a PDU session, or trigger the establishment of a new PDU session.

The current URSP rule includes a traffic descriptor. The UE determines whether to perform the URSP rule based on whether an application run on the UE matches the traffic descriptor in the URSP rule.

SUMMARY

According to various embodiments of the disclosure, a method for obtaining a user equipment (UE) route selection policy (URSP) rule, a method for performing a route selection policy rule, an apparatus, a device, and a computer-readable storage medium for obtaining the URSP rule, an apparatus, a device, and a computer-readable storage medium for performing the URSP rule are provided.

According to an aspect of an example embodiment of the disclosure, there is provided a method for obtaining a route selection policy, performed by a policy control function network element including at least one processor, the method including: generating a route selection policy rule for a terminal; transmitting an application function response to an application function network element after generation of the route selection policy rule for the terminal; and providing, to the terminal, the route selection policy rule, wherein the route selection policy rule includes at least one of a valid time or a valid location, the valid time representing a time at which the route selection policy rule is applicable, and the valid location representing a geographical location at which the route selection policy rule is applicable.

The route selection policy rule may include an application descriptor; and the application descriptor may include an operating system identifier and an application identifier.

The application descriptor may further include a service differentiator, the service differentiator being used for identifying a service type of traffic in an application.

The providing the route selection policy rule may include providing, to the terminal, the route selection policy rule, upon which routing of traffic matching the service differentiator in the terminal is controlled based on the route selection policy rule.

The route selection policy rule may further include the application descriptor and the service differentiator, the service differentiator being not located in the application descriptor.

The method may further include receiving an application function request from the application function network element, the application function request being used for requesting to generate the route selection policy rule.

The generating the route selection policy rule for the terminal may include at least one of: generating the route selection policy rule for the terminal according to the application function request; generating the route selection policy rule for the terminal according to a local policy; or generating the route selection policy rule for the terminal according to the application function request and the local policy.

The route selection policy rule may further include a terminal identifier or a terminal group identifier.

The providing the route selection policy rule to the terminal may include providing the route selection policy rule to the terminal corresponding to the terminal identifier or the terminal group identifier.

According to an aspect of an example embodiment of the disclosure, there is provided an apparatus for obtaining a route selection policy, comprising: at least one memory configured to store program code; and at least one processor configured to read the program code and operate as instructed by the program code, the program code comprising: generation code configured to cause at least one of the at least one processor to generate a route selection policy rule for a terminal; transmission code configured to cause at least one of the at least one processor to transmit an application function response to an application function network element after generation of the route selection policy rule for the terminal; and provision code configured to cause at least one of the at least one processor to provide, to the terminal, the route selection policy rule, wherein the route selection policy rule comprises at least one of a valid time or a valid location, the valid time representing a time at which the route selection policy rule is applicable, and the valid location representing a geographical location at which the route selection policy rule is applicable.

The route selection policy rule may include an application descriptor; and the application descriptor comprises: an operating system identifier and an application identifier.

The application descriptor may include a service differentiator, the service differentiator being used for identifying a service type of traffic in an application.

The provision code may be further configured to cause at least one of the at least one processor to provide, to the terminal, the route selection policy rule, upon which routing of traffic matching the service differentiator in the terminal is controlled based on the route selection policy rule.

The route selection policy rule may further include the application descriptor and the service differentiator, the service differentiator being not located in the application descriptor.

The program code may further include receiving code configured to cause at least one of the at least one processor to receive an application function request from the application function network element, the application function request being used for requesting to generate the route selection policy rule.

The generation code may be further configured to cause at least one of the at least one processor to generate at least one of: the route selection policy rule for the terminal according to the application function request; the route selection policy rule for the terminal according to a local policy; or the route selection policy rule for the terminal according to the application function request and the local policy.

The route selection policy rule may further include a terminal identifier or a terminal group identifier.

The provision code may be further configured to cause at least one of the at least one processor to provide the route selection policy rule to the terminal corresponding to the terminal identifier or the terminal group identifier.

According to an aspect of an example embodiment of the disclosure, there is provided a non-transitory computer-readable storage medium, storing computer-readable program instructions, the computer-readable program instructions being executable by at least one processor to perform: generating a route selection policy rule for a terminal; transmitting an application function response to an application function network element after generation of the route selection policy rule for the terminal; and providing, to the terminal, the route selection policy rule, wherein the route selection policy rule comprises at least one of a valid time or a valid location, the valid time representing a time at which the route selection policy rule is applicable, and the valid location representing a geographical location at which the route selection policy rule is applicable.

BRIEF DESCRIPTION OF THE DRAWINGS

To describe the technical solutions in the example embodiments of the disclosure more clearly, the following briefly describes the accompanying drawings required for describing the example embodiments. Apparently, the accompanying drawings in the following description show only some embodiments of the disclosure, and a person of ordinary skill in the art may still derive other accompanying drawings according to the accompanying drawings without creative efforts.

DETAILED DESCRIPTION

To make the objectives, technical solutions, and advantages of the disclosure clearer, the following further describes implementations of the disclosure in detail with reference to the accompanying drawings.

Figure 1:
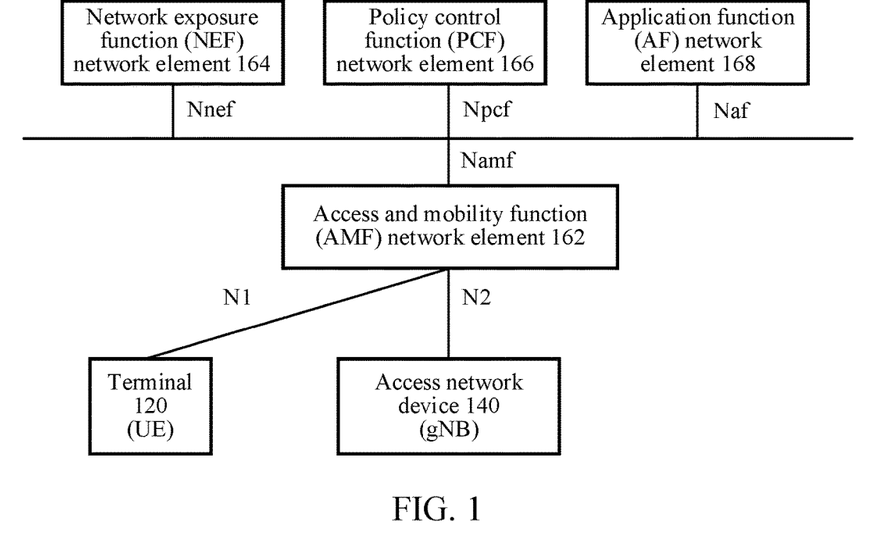
FIG. 1 is a schematic structural diagram of a mobile communication system according to an example embodiment of the disclosure.

FIG. 1 is a structural block diagram of a mobile communication system 100 according to an example embodiment of the disclosure. Schematically, the mobile communication system 100 is a communication frame in a non-roaming scenario. The mobile communication system 100 includes: a terminal 120, an access network device 140, an access and mobility function (AMF) network element 162, a network exposure function (NEF) network element 164, a policy control function (PCF) network element 166 and an application function (AF) network element 168.

The terminal 120 may be referred to as user equipment (UE), which may be a device that provides voice and/or data connectivity to a user. The terminal may communicate with one or more core networks through a radio access network (RAN). The terminal 120 may be a mobile terminal, for example, a mobile phone (or referred to as a "cellular" phone) and a computer with a mobile terminal, for example, may be a portable, pocket-sized, handheld, computer built-in, or in-vehicle mobile apparatus. For example, the terminal 120 may include a subscriber unit, a subscriber station, a mobile station, a mobile, a remote station, an access point, a remote terminal, an access terminal, a user terminal, a user agent, a user device or UE.

The terminal 120 and the access network device 140 establish a wireless connection through a wireless air interface. Optionally, the wireless air interface is a wireless air interface based on a 5G standard. For example, the wireless air interface is new radio (NR). Alternatively, the wireless air interface may be a wireless air interface based on a next-generation-of-5G mobile communication network technology standard.

The access network device 140 may be a base station. For example, the base station may be a base station (gNB) using a centralized or distributed architecture in the 5G system. When using the centralized or distributed architecture, the access network device 120 generally includes a central unit (CU) and at least two distributed units (DU). The CU and the DU are provided with a protocol stack including a service data adaptation protocol (SDAP) layer, a packet data convergence protocol (PDCP) layer, a radio link control (RLC) layer, a physical (PHY) layer, and a media access control (MAC) layer. The arrangement of protocol stacks in the CU and the DU is determined according to a logical function division method of the CU and the DU. A specific implementation of the access network device 140 is not limited in this embodiment of the disclosure.

The access network device 140 and a core-network network element are connected in a wired connection manner or a wireless connection manner. The wired connection may be implemented by using an optical fiber cable or a cable.

The core-network network element includes: the AMF network element 162, the NEF network element 164, the PCF network element 166 and the AF network element 168. Optionally, the AMF network element 162 is connected to a non-access stratum (NAS) of the terminal 120 through an N1 interface, and the AMF network element 162 is further connected to the access network device 140 through an N2 interface. The AMF network element 162 is connected to the PCF network element 166 and other core-network network elements, the NEF network element 164 is connected to the PCF network element 166 and other core-network network elements, and the AF network element 168 may be separately connected to the PCF network element 166 and the NEF network element 164.

User equipment (UE) route selection policy (URSP) rules are provided in the third generation partnership project technical specification (3GPP TS) 23.503, and the UE determines, by using a URSP rule, how to route outgoing traffic. The UE may route the traffic to a protocol data unit (PDU) session, or may offload the traffic to non-3GPP access outside a PDU session, or trigger the establishment of a new PDU session.

The PCF network element selects a URSP applicable to every UE according to local configuration, subscribed single network slice selection assistance information (S-NSSAI) and an operation policy. The operation policy includes: cumulative usage, load level information of each network slice instance, and UE locations.

The URSP is provided to the AMF network element from the PCF network element, and then is provided to the UE from the AMF network element through the N1 interface. When the UE has valid URSP rules, the UE performs correspondingly association with PDU sessions according to user preferences and the rules.

Schematically, Table 1 shows an example of a URSP provided in the related art.

TABLE 1

| Information name | Description | Category | PCF permitted to modify in a UE context | Scope |
|---|---|---|---|---|
| 1 Rule Precedence | It determines the order the URSP rule is performed in the UE | Mandatory (Note 1) | Yes | UE context |
| 2 Traffic descriptor | This part defines the traffic descriptor of the URSP rule (including at least one element from 2.1 to 2.5 below) | | | |
| 2.1 Application descriptors | It consists of an operating system identifier OSid and an application identifier OSAppid | Optional | Yes | UE context |
| 2.2 IP descriptors | IP triplets (a destination IP address, a destination port number, and a protocol ID) | Optional | Yes | UE context |
| 2.3 Non-IP descriptors | Descriptor(s) for non-IP communication | Optional | Yes | UE context |

TABLE 1-continued

| Information name | Description | Category | PCF permitted to modify in a UE context | Scope |
|---|---|---|---|---|
| 2.4 Data network names | This is matched against the DNN information provided by an application | Optional | Yes | UE context |
| 2.5 Connection capabilities | This is matched against the information provided by the application of the UE when it requests a network connection with specific functions | Optional | Yes | UE context |
| 3 List of route selection descriptors | A list of route selection descriptors | Mandatory | | |

(Note 1):
Rules in a URSP shall have different precedence values
Note 2:
OSId and OSAppId are used for identifying applications operated on an operating system of the UE.

In the foregoing table, the traffic descriptor includes a plurality of parameters such as the application descriptor, the IP descriptor, the non-IP descriptor, the data network name, and the connection capability.

Each URSP rule includes one traffic descriptor, and the traffic descriptor is used for determining whether a specific service matches the URSP rule.

The application descriptor in the foregoing URSP rule is effective for identifying an application that generates traffic from a specific application. However, one application may provide a plurality of traffic with different characteristics, and the foregoing application descriptor cannot identify the traffic with different characteristics of the one application.

In a technical solution provided in the embodiments of the disclosure, a service differentiator is added to the traffic descriptor of the URSP rule. The service differentiator may also be referred to as other names such as a service difference symbol, a service identifier, and a service type. In this specification, the service differentiator is used as an example for description, and the name of the service differentiator is not limited.

The service differentiator is used for identifying a service type of traffic in an application. That is, the service differentiator is used for identifying a category of a data packet of the application. The service differentiator may be defined by an AF network element or a mobile network operator (MNO). The service differentiator may be the same or different among different applications.

Optionally, the traffic descriptor includes at least one of an application descriptor or the service differentiator. When the traffic descriptor includes the service differentiator but does not include the application descriptor, the traffic descriptor may be used for identifying matching traffic of a specific service type of a plurality of different applications. Alternatively, when the traffic descriptor includes the application descriptor but does not include the service differentiator, the traffic descriptor may be used for identifying matching traffic of different service types of a specific application. Alternatively, when the traffic descriptor includes the application descriptor and the service differentiator, the traffic descriptor may be used for identifying matching traffic of a specific service type of a specific application.

When the application descriptor and the service differentiator are both included in the traffic descriptor, the service differentiator may be added to the application descriptor, or may be added outside the application descriptor.

The combination of the application descriptor and the service differentiator may uniquely identify one or more service types in an application. Optionally, the one or more identified services are a subset of all services in the application.

Figure 2:
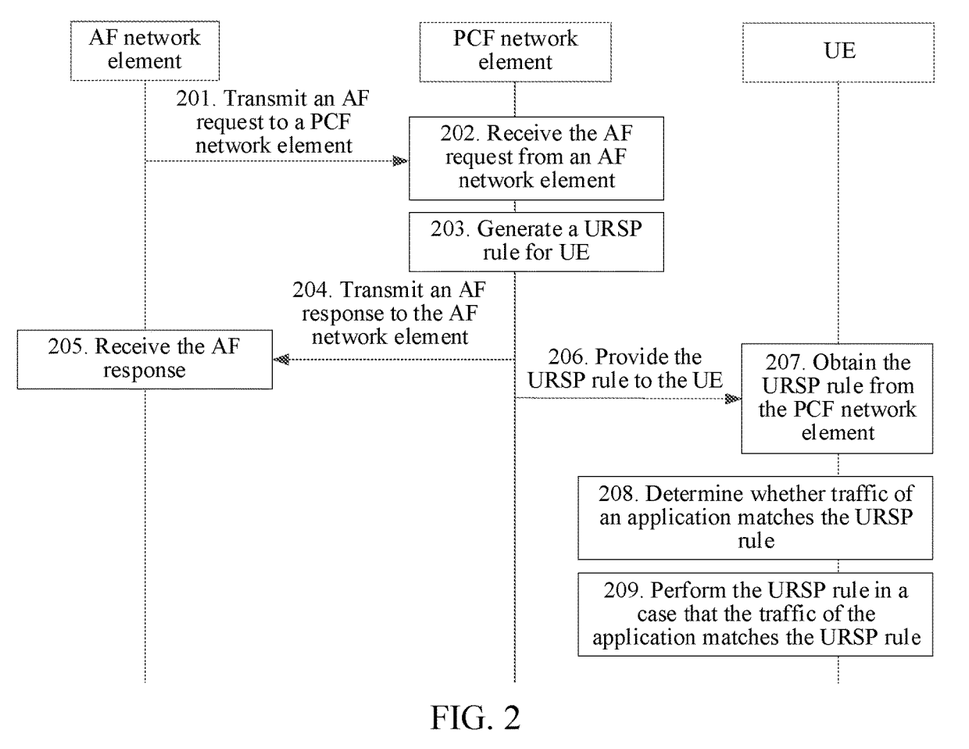
FIG. 2 is a flowchart of a method for obtaining a route selection policy according to an example embodiment of the disclosure.

FIG. 2 is a flowchart of a method for obtaining a route selection policy according to an example embodiment of the disclosure. This method is described by using an example in which the method is applied to the mobile communication system shown in FIG. 1. The method includes the following operations 201-209:

Operation 201. The AF network element transmits an AF request to the PCF network element.

The AF request is used for requesting to generate a URSP rule. The AF request includes a service type, the service type being used for indicating a service in an application.

Optionally, one application has one or more services. Each service has a service type. That is, the services are in one-to-one correspondence with the service types.

Optionally, the service type includes but is not limited to at least one of an audio service, a video service, a text service, a voice service, a map service, a payment service, an alarm service, an Internet of vehicles service, an Internet of things service, or a low-latency and high-reliable service.

Operation 202. The PCF network element receives the AF request from the AF network element.

Optionally, the AF network element provides the AF request through the NEF network element, the NEF network element forwards the AF request to the PCF network element, and the PCF network element generates an appropriate URSP rule according to the AF request.

Operation 203. The PCF network element generates a URSP rule for the UE. The URSP rule includes a service differentiator, the service differentiator being used for identifying a service type of traffic in an application.

The PCF network element generates a URSP rule for one or more UEs according to the AF request. The URSP rule includes a service differentiator, the service differentiator being used for identifying a service type of traffic in an application.

Optionally, service types are in one-to-one correspondence with service differentiators. The service differentiator is information that uses at least one of numbers, characters, or symbols to describe the service type.

In an example, the correspondence between the service types and the service differentiators is shown in Table 2.

TABLE 2

| Service type | Service differentiator |
| --- | --- |
| Audio | 00 |
| Video | 01 |
| Payment | 02 |

Optionally, a traffic descriptor of the URSP rule further includes an application descriptor. When the application descriptor and the service differentiator are both included in the traffic descriptor, the application descriptor and the service differentiator are used for identifying one or more designated service types in an application, so that data packets of one or more service types in the application are matched.

Optionally, when a traffic descriptor of the URSP rule includes the service differentiator but does not include an application descriptor, the service differentiator is used for identifying a designated service type in different applications, so that data packets of the same service type in different applications are matched.

Operation 204. The PCF network element transmits an AF response to the AF network element.

Optionally, the AF response includes the correspondence between the service type and the service differentiator.

Optionally, the PCF network element maintains the correspondence between the service type and the service differentiator. The PCF network element transmits the correspondence to the AF network element through the NEF network element.

Operation 205. The AF network element receives the AF response.

Operation 206. The PCF network element provides the URSP rule to the UE.

The URSP rule is to be performed by the UE in a case that there is traffic matching the service differentiator.

Optionally, the PCF network element provides the URSP rule to the AMF network element, and the AMF network element provides the URSP rule to the UE through an N1 interface.

Operation 207. The UE obtains the URSP rule from the PCF network element.

Operation 208. The UE determines whether the traffic of the application matches the URSP rule.

The URSP rule includes the service differentiator, the service differentiator being used for identifying a service type of the traffic in the application.

Operation 209. The UE performs the URSP rule in a case that the traffic of the application matches the URSP rule.

The UE performs the URSP rule in a case that the traffic of the application matches criteria (or referred to as elements) in a traffic descriptor in the URSP rule.

In an embodiment, the UE performs the URSP rule in a case that the traffic descriptor of the URSP rule includes both the application descriptor and the service differentiator, and the traffic of the application matches both the application descriptor and the service differentiator.

In another embodiment, the UE performs the URSP rule in a case that the traffic descriptor of the URSP rule includes the application descriptor, the application descriptor includes the service differentiator, and the traffic of the application matches all the identifiers (including the service differentiator) in the application descriptor.

According to the method provided in this embodiment, by adding the service differentiator in the URSP rule, the service type of the traffic of the application may be identified by using the service differentiator, so that different URSP rules are used for traffic of different service types of an application, and the URSP rule based on granularity of the application is changed to the URSP rule based on granularity of the service type, improving a subdivision capability of the URSP rule and the flexibility thereof in execution.

In an optional embodiment based on the foregoing method embodiment, the service differentiator may be added to the application descriptor. The application descriptor is formed by an operating system identifier OSId, an application identifier OSAppId, and the service differentiator. The operating system identifier OSId is used for identifying an operating system operated on the terminal, the application identifier OSAppId is used for identifying an application operated on the operating system, and the service differentiator is used for identifying a service type of traffic (or a data packet) in the application.

The service differentiator is represented in at least one form of a character, a number, and a symbol.

Example 1 (Service Differentiators Represented by Using Chinese Characters)

Application descriptor 1:
OSId: IOS;
OSAppId: Online video application A;
Service differentiator: 视频业务 ;
Application descriptor 2:
OSId: Android;
OSAppId: Online video application A;
Service differentiator: 支付业务 ;

Example 2 (Service Differentiators Represented by Using Numbers)

Application descriptor 3:
OSId: IOS;
OSAppId: Online video application B;
Service differentiator: 1;
Application descriptor 4:
OSId: Android;
OSAppId: Online video application B;
Service differentiator: 2.

In another optional embodiment based on the foregoing method embodiment, the service differentiator may be provided outside the application descriptor. That is, the service differentiator is not included in the application descriptor, and is provided in parallel to (or separate from) the application descriptor. In this case, the traffic descriptor may only include the service differentiator without setting the application descriptor.

Example 3

Traffic descriptor: XX;
Application descriptor: voice chatting application;
Service differentiator: payment.
Route selection descriptor:
Network slice: S-NSSAI #1;
SSC mode: SSC mode 3.

In an optional embodiment based on the foregoing method embodiment, provided is a process in which the AF network element provides the AF request through the NEF network element, the NEF network element forwards the AF request to the PCF network element, and the PCF network element generates an appropriate URSP rule according to the AF request, which will be described in detail with reference to the following embodiments.

Figure 3:
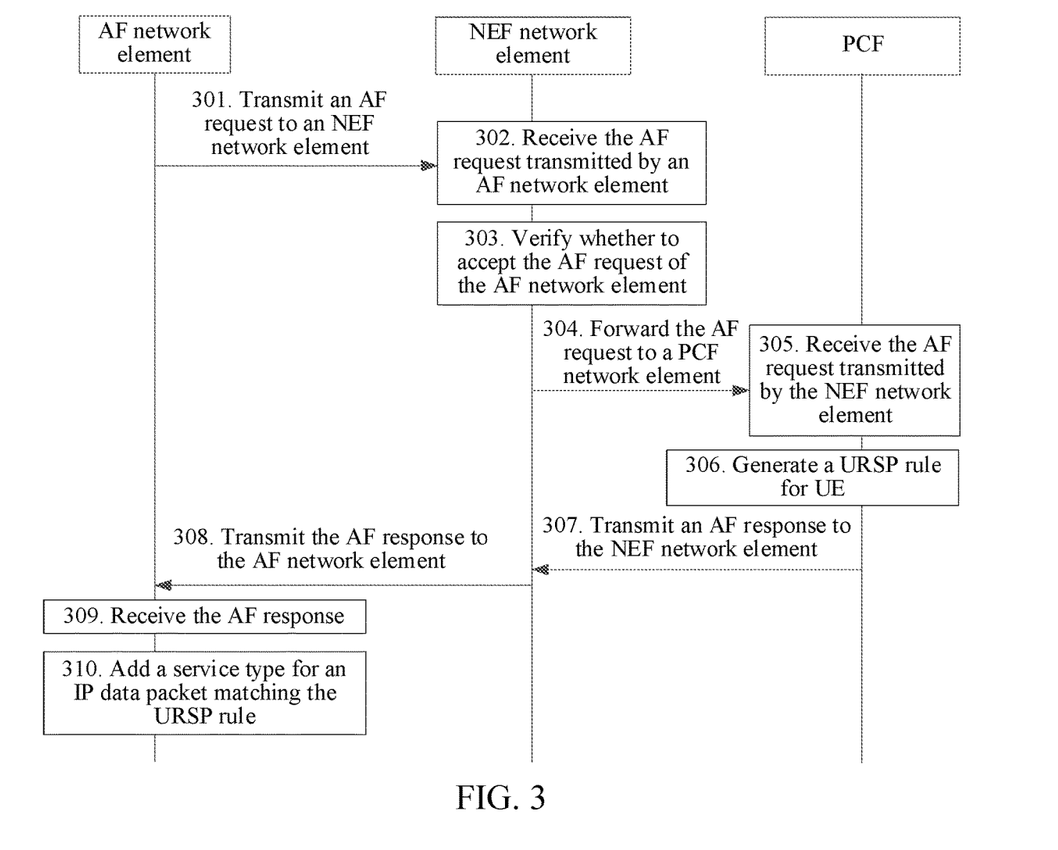
FIG. 3 is a flowchart of a method for performing a route selection policy rule according to an example embodiment of the disclosure.

FIG. 3 is a flowchart of a method for obtaining a route selection policy according to an example embodiment of the disclosure. This method is described by using an example in which the method is applied to the mobile communication system shown in FIG. 1. The method includes the following operations 301-310:

Operation 301. The AF network element transmits an AF request to the NEF network element, the AF request being used for requesting to generate a URSP rule.

The AF request includes: an AF identifier, a service type and a requested route policy. The AF identifier is used for uniquely identifying the AF network element and an application corresponding to the AF network element. The service type is used for identifying one or more service types of traffic in the application. The requested route policy is used for representing a generated route policy requested by the AF network element.

In an embodiment, the AF request further includes an identifier of the UE. The identifier of the UE is used for representing one or more UEs to which the URSP rule is applicable.

In an embodiment, the AF request further includes: a group identifier of a UE group. The group identifier of the UE group is used for representing one or more groups of UEs to which the URSP rule is applicable.

In an embodiment, the AF request further includes: a valid time and/or a valid location. The valid time is used for representing a time at which the URSP rule is applicable, and the valid location is used for representing a geographical location (or a range of the geographical location or a cell location) at which the URSP rule is applicable.

Operation 302. The NEF network element receives the AF request transmitted by the AF network element.

Operation 303. The NEF network element verifies whether to accept the AF request of the AF network element.

The NEF network element verifies whether to accept the AF request of the AF network element according to a preset verification criterion.

When the AF request is accepted, operation 304 is performed; when the AF request is not accepted, the NEF network element performs operation 308.

Operation 304. The NEF network element forwards the AF request to the PCF network element.

When the NEF network element receives the AF request and verifies to accept the AF request, the NEF network element transmits the AF request to the PCF network element.

Operation 305. The PCF network element receives the AF request transmitted by the NEF network element.

Operation 306. The PCF network element generates the URSP rule for the UE.

The PCF network element generates the URSP rule for all UEs or designated UE. The URSP rule includes a service differentiator, the service differentiator being used for identifying a service type of traffic in an application.

Schematically, Table 3 shows a URSP rule provided in an optional embodiment. In the URSP rule, the service differentiator is located in an application descriptor.

TABLE 3

| Information name | Description | Category | The PCF network element permitted to modify in a UE context | Scope |
| --- | --- | --- | --- | --- |
| 1 Rule precedence | It determines the order the URSP rule is performed in the UE | Mandatory (Note 3) | Yes | UE context |
| 2 Traffic descriptor | This part defines the traffic descriptor of the URSP rule (including at least one element from 2.1 to 2.5) | | | |

TABLE 3-continued

| Information name | Description | Category | The PCF network element permitted to modify in a UE context | Scope |
|---|---|---|---|---|
| 2.1 Application descriptors | It consists of an operating system identifier OSId, an application identifier OSAppId, and a service differentiator (Note 4) | Optional | Yes | UE context |
| 2.2 IP descriptors | IP triplets (a destination IP address, a destination port number, and a protocol ID) | Optional | Yes | UE context |
| 2.3 Non-IP descriptors | Descriptor(s) for non-IP communication | Optional | Yes | UE context |
| 2.4 Data network names | This is matched against the DNN information provided by an application | Optional | Yes | UE context |
| 2.5 Connection capabilities | This is matched against the information provided by the application of the UE when it requests a network connection with specific functions | Optional | Yes | UE context |
| 3 List of route selection descriptors | A list of route selection descriptors | Mandatory | | |

(Note 3):
Rules in a URSP shall have different precedence values
(Note 4):
OSId, OSAppId and the service differentiator are used for identifying applications operated on an operating system of the UE.

Schematically, Table 4 shows a URSP rule provided in an optional embodiment. In the URSP rule, the service differentiator is applied outside an application descriptor.

TABLE 4

| Information name | Description | Category | The PCF network element permitted to modify in a UE context | Scope |
|---|---|---|---|---|
| 1 Rule precedence | It determines the order the URSP rule is performed in the UE | Mandatory (Note 5) | Yes | UE context |
| 2 Traffic descriptor | This part defines the traffic descriptor of the URSP rule (including at least one element from 2.1 to 2.5 below) | | | |
| 2.1 Application descriptors | It consists of an operating system identifier OSId and an application identifier OSAppId | Optional | Yes | UE context |
| 2.2 Service differentiators | It is used for describing a service of traffic in the application | Optional | Yes | UE context |
| 2.3 IP descriptors | IP triplets (a destination IP address, a destination port number, and a protocol ID) | Optional | Yes | UE context |
| 2.4 Non-IP descriptors | Descriptor(s) for non-IP communication | Optional | Yes | UE context |
| 2.5 Data network names | This is matched against the DNN information provided by an application | Optional | Yes | UE context |
| 2.6 Connection capabilities | This is matched against the information provided by the application of the UE when it requests a network connection with specific functions | Optional | Yes | UE context |
| 3 List of route selection descriptors | A list of route selection descriptors | Mandatory | | |

(Note 5):
Rules in a URSP shall have different precedence values

Optionally, the URSP rule may further include a valid time and/or a valid location. The valid time and/or the valid location are/is provided by the AF network element, or, generated by the PCF network element according to a local policy.

Optionally, the service differentiator is generated by the PCF network element according to the service type in the AF request, and service types are in one-to-one correspondence with service differentiators. The PCF network element maintains the correspondence between the service types and the service differentiators.

For example, Table 5 shows the correspondence between the service types and the service differentiators.

TABLE 5

| Service type | Audio | Video | Payment | . . . |
|---|---|---|---|---|
| Service differentiator | 1 | 2 | 3 | . . . |

Optionally, the PCF network element generates the URSP rule according to the AF request; alternatively, the PCF network element generates the URSP rule according to a local policy; alternatively, the PCF network element generates the URSP rule according to the AF request and a local policy. The local policy is a policy configured in the PCF network element.

Optionally, the PCF network element may also refuse to generate the URSP rule according to the local policy.

Operation 307. The PCF network element transmits an AF response to the NEF network element.

The PCF network element generates and transmits the AF response to the NEF network element after the URSP rule is generated. Optionally, the AF response includes the correspondence between the service types and the service differentiators.

When generation of the URSP rule is refused according to the local policy, the AF response may include a reason for the rejection.

Operation 308. The NEF network element transmits the AF response to the AF network element.

When the PCF network element generates the URSP rule, the NEF network element transmits the AF response to the AF network element, the AF response including the correspondence between the service types and the service differentiators.

When the PCF network element refuses to generate the URSP rule or the NEF network element fails to verify to accept the AF request, the NEF network element transmits the AF response to the AF network element, and the AF response includes a reason for the rejection.

Operation 309. The AF network element receives the AF response.

Operation 310. The AF network element adds a service type for an IP data packet matching the URSP rule.

After the AF network element obtains the AF response based on generation of the URSP rule from the PCF network element, the IP data packet in the application may be further marked by using special tags, so that the UE identifies traffic of one or more service types in the application.

The service type is added to an extension bit in a type-of-service (TOS) field of the IP data packet; alternatively, the service type is added to an extension field of a packet header of the IP data packet.

Optionally, as an alternative to the service type, the AF network element adds the service differentiator to the extension bit of the TOS field of the IP data packet; or, adds the service differentiator to the extension field of the packet header of the IP data packet.

According to the method provided in this embodiment, by adding the service differentiator in the URSP rule, the service type of the traffic of the application may be identified by using the service differentiator, so that different URSP rules are used for traffic of different service types of one application, and the URSP rule based on granularity of the application is changed to the URSP rule based on granularity of the service, improving a subdivision capability of the URSP rule and the flexibility thereof in execution.

Optionally, by adding the service differentiator in the application descriptor, the application descriptor may include the operating system identifier, the application identifier and the service differentiator, thereby identifying traffic of different services in an application, and improving a subdivision capability of the application descriptor and the flexibility thereof when being performed.

Optionally, by adding the service differentiator outside the application descriptor, a format of the original application descriptor cannot be modified. For example, the service differentiator is added to the extension field, to enhance the compatibility of the URSP rule.

Optionally, by adding the valid time and/or the valid location in the URSP rule, a network side may not need to repeatedly update the URSP rule to the UE after the time or location changes, thereby avoiding increasing unnecessary signaling overheads, and enabling the UE to determine to perform the URSP rule at a proper time and/or location.

In an optional embodiment based on the foregoing method, after the PCF network element generates the URSP rule, the PCF network element provides the URSP rule to the AMF network element, and then the AMF network element provides the URSP rule to the UE through an N1 interface. Further descriptions are provided with reference to the following embodiments.

Figure 4:
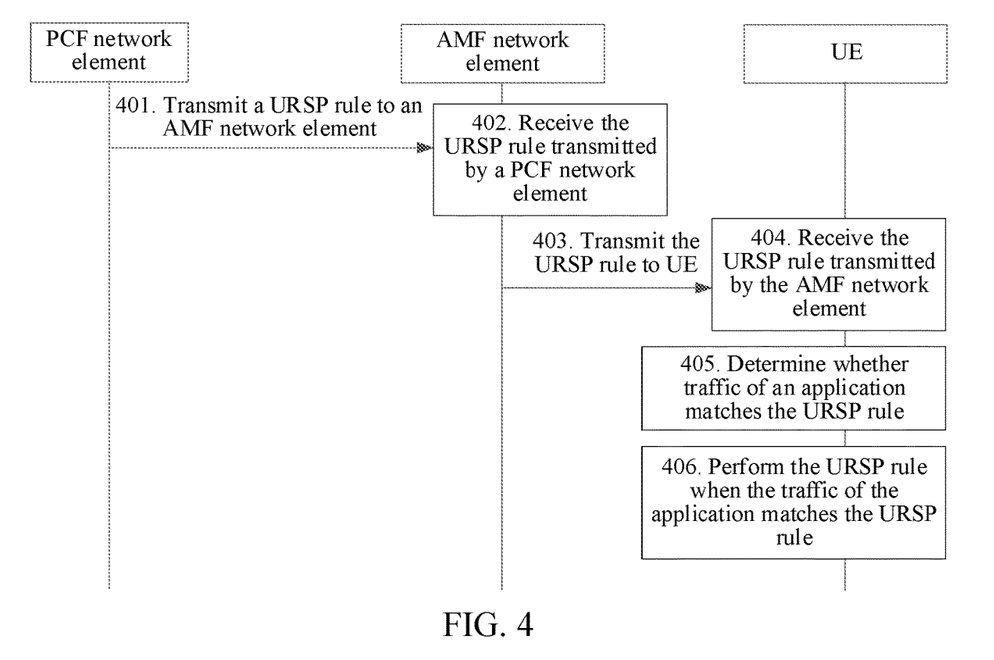
FIG. 4 is a flowchart of a method for performing a route selection policy rule according to an example embodiment of the disclosure.

FIG. 4 is a flowchart of a method for performing a route selection policy rule according to an example embodiment of the disclosure. This method is described by using an example in which the method is applied to the mobile communication system shown in FIG. 1. The method includes operations 401-406:

Operation 401. The PCF network element transmits a URSP rule to the AMF network element.

Operation 402. The AMF network element receives the URSP rule transmitted by the PCF network element.

Operation 403. The AMF network element transmits the URSP rule to the UE.

The AMF network element transmits the URSP rule to the UE through the N1 interface.

Operation 404. The UE receives the URSP rule transmitted by the AMF network element.

The UE receives the URSP rule transmitted by the AMF network element through the N1 interface.

Operation 405. The UE determines whether traffic of an application matches the URSP rule, the URSP rule including a service differentiator, the service differentiator being used for identifying a service type of the traffic in the application.

When the application receives or transmits a data packet, the UE determines whether the traffic of the application matches the URSP rule.

When a traffic descriptor in the URSP rule includes an application descriptor and the service differentiator, the UE determines whether the traffic of the application matches both the application descriptor and the service differentiator.

When a traffic descriptor in the URSP rule includes a plurality of parameters such as an application descriptor, the service differentiator, an IP descriptor and a data network name, the UE determines whether the traffic of the application matches both the plurality of parameters.

In a case that the traffic of the application matches at least one criterion or criteria in a traffic descriptor in the URSP rule, operation 406 is performed. In a case that the traffic of the application does not match the URSP rule, nothing is performed or other logic is performed.

Operation 406. The UE performs the URSP rule in a case that the traffic of the application matches the URSP rule.

In a case that the traffic of the application matches at least one criterion or criteria in a traffic descriptor in the URSP rule, the UE performs route selection according to a list of route selection descriptors in the URSP rule.

Using the URSP rule in the foregoing example 3 as an example, the UE routes a data packet of a payment service of a voice chatting application to a network slice S-NSSAI #1 having the SSC mode 3 for transmission.

Optionally, when the URSP rule further includes a valid time, the UE performs the URSP rule in a case that the traffic of the application matches at least one criterion or criteria in a traffic descriptor in the URSP rule and a current time belongs to the valid time.

Optionally, when the URSP rule further includes a valid location, the UE performs the URSP rule in a case that the traffic of the application matches at least one criterion or criteria in a traffic descriptor in the URSP rule and a current location belongs to the valid location.

Optionally, when the URSP rule further includes a valid time and a valid location, the UE performs the URSP rule in a case that the traffic of the application matches at least one criterion or criteria in a traffic descriptor in the URSP rule, a current time belongs to the valid time and a current location belongs to the valid location.

In an optional embodiment, when a current time does not belong to the valid time or a current location does not belong to the valid location, the UE deletes the URSP rule; alternatively, when a current time does not belong to the valid time or a current location does not belong to the valid location, the UE deactivates the URSP rule.

According to the method provided in this embodiment, by adding the service differentiator in the URSP rule, the service type of the traffic of the application may be identified by using the service differentiator, so that different URSP rules are used for traffic of different service types of one application, and the URSP rule based on granularity of the application is changed to the URSP rule based on granularity of the service, thereby improving a subdivision capability of the URSP rule and the flexibility thereof in execution.

Optionally, by adding the service differentiator in the application descriptor, the application descriptor may include the operating system identifier, the application identifier and the service differentiator, thereby identifying traffic of different services in an application, and improving a subdivision capability of the application descriptor and the flexibility thereof when being performed.

Optionally, by adding the service differentiator outside the application descriptor, a format of the original application descriptor cannot be modified. For example, the service differentiator is added to the extension field, to enhance the compatibility of the URSP rule. If the traffic descriptor only has the service differentiator but no application descriptor, an objective of performing service route on traffic of a specific service type of different applications is achieved.

Optionally, by adding the valid time and/or the valid location in the URSP rule, a network side may not need to repeatedly update the URSP rule to the UE after the time or location changes, thereby avoiding increasing unnecessary signaling overheads, and enabling the UE to determine to perform the URSP rule at a proper time and/or location.

The operations performed by the terminal (or user equipment) in the foregoing method embodiments may be independently implemented as a method for performing a route selection policy rule for a terminal side. The operations performed by the AF/PCF network element in the foregoing method embodiments may be independently implemented as a method for obtaining a route selection policy for an AF/PCF network element side.

It is to be understood that although the operations of the flowcharts in FIG. 2 to FIG. 4 are shown sequentially according to arrows, the operations are not necessarily performed in the orders indicated by arrows. Unless otherwise clearly specified in this specification, the operations are performed without any sequence limit, and may be performed in other orders. Moreover, at least some of the operations in FIG. 2 to FIG. 4 may include a plurality of sub-operations or a plurality of stages. The sub-operations or stages are not necessarily performed at the same time, but may be performed at different times. The sub-operations or stages are not necessarily performed sequentially, but may be performed in turn or alternately with at least one part of the other operations or sub-operations of other operations or stages.

Apparatus embodiments of the disclosure are described below. Reference may be made to the foregoing method embodiments in one-to-one correspondence with the apparatus embodiments for details that are not described in the apparatus embodiments.

Figure 5:
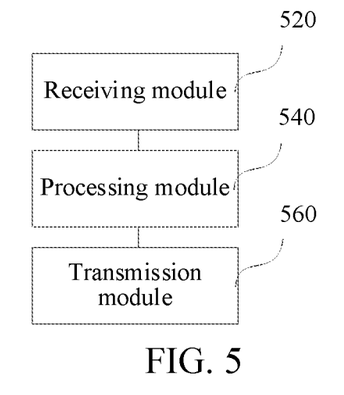
FIG. 5 is a block diagram of an apparatus for obtaining a route selection policy according to an example embodiment of the disclosure.

FIG. 5 is a block diagram of an apparatus for obtaining a route selection policy according to an example embodiment of the disclosure. The apparatus may be implemented as a part of a PCF network element by using software, hardware, or a combination thereof, that is, applied to the PCF network element. The apparatus includes:

a receiving module 520, configured to receive an application function (AF) request from an AF network element, the application function request being used for requesting to generate a route selection policy rule;

a processing module 540, configured to generate the route selection policy rule for a terminal, the route selection policy rule including a service differentiator, the service differentiator being used for identifying a service type of traffic in an application; and a transmission module 560, configured to transmit an application function response to the AF network element, the transmission module 560 being further configured to provide the route selection policy rule to the terminal, the route selection policy rule being configured to be performed by the terminal in a case that there is traffic matching the service differentiator.

In an optional embodiment, the route selection policy rule further includes an application descriptor.

the application descriptor includes: an operating system identifier, an application identifier and the service differentiator.

In an optional embodiment, the route selection policy rule includes an application descriptor and the service differentiator, the application descriptor and the service differentiator being in parallel (or separate from each other); alternatively, the route selection policy rule includes an application descriptor and the service differentiator, the service differentiator being located in the application descriptor.

In an optional embodiment, the processing module 540 is configured to generate the route selection policy rule for the terminal according to the application function request; alternatively, the processing module 540 is configured to generate the route selection policy rule for the terminal according to a local policy; alternatively, the processing module 540 is configured to generate the route selection policy rule for the terminal according to the application function request and a local policy.

In an optional embodiment, the route selection policy rule further includes: a terminal identifier or a terminal group identifier.

In an optional embodiment, the transmission module 560 is configured to provide the route selection policy rule to the terminal corresponding to the terminal identifier or the terminal group identifier.

In an optional embodiment, the route selection policy rule further includes: a valid time and/or a valid location.

Figure 6:
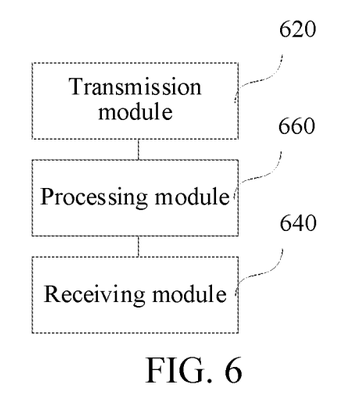
FIG. 6 is a block diagram of an apparatus for performing a route selection policy rule according to an example embodiment of the disclosure.

FIG. 6 is a block diagram of an apparatus for obtaining a route selection policy according to an example embodiment of the disclosure. The apparatus may be implemented as a part of an AF network element by using software, hardware, or a combination thereof, that is, applied to the AF network element. The apparatus includes:

a transmission module 620, configured to transmit an application function request to a PCF network element, the application function request being used for requesting to generate a route selection policy rule; and a receiving module 640, configured to receive an application function response transmitted by the PCF network element, the application function response being transmitted by the PCF network element after generating the route selection policy rule for a terminal according to the application function request, the route selection policy rule including a service differentiator, the service differentiator being used for distinguishing a service type of traffic in an application.

In an optional embodiment, the application function request includes: an application function identifier, the service type and a requested route policy.

In an optional embodiment, the application function request further includes: a terminal identifier or a terminal group identifier.

In an optional embodiment, the application function request further includes: a valid time and/or a valid location.

In an optional embodiment, the apparatus further includes a processing module 660.

The processing module 660 includes adding the service type to an IP data packet matching the route selection policy rule.

In an optional embodiment, the service type is added to an extension bit in a TOS field of the IP data packet; alternatively, the service type is added in an extension field of a packet header of the IP data packet.

Figure 7:
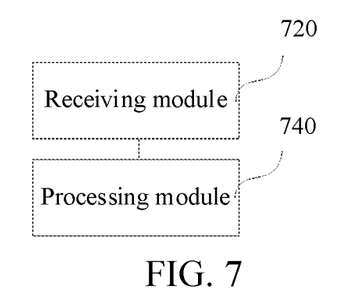
FIG. 7 is a block diagram of an apparatus for performing a route selection policy rule according to an example embodiment of the disclosure.

FIG. 7 is a block diagram of an apparatus for performing a route selection policy rule according to an example embodiment of the disclosure. The apparatus may be implemented as a part of UE by using software, hardware, or a combination thereof, that is, applied to the UE. The apparatus includes:

a receiving module 720, configured to obtain a route selection policy rule from a PCF network element; and a processing module 740, configured to determine whether traffic of an application matches the route selection policy rule, the route selection policy rule including a service differentiator, the service differentiator being used for identifying a service type of the traffic in the application, the processing module 740 being further configured to perform the route selection policy rule in a case that the traffic of the application matches the route selection policy rule.

In an optional embodiment, the route selection policy rule further includes an application descriptor.

the application descriptor includes: an operating system identifier, an application identifier and the service differentiator.

In an optional embodiment, the route selection policy rule includes an application descriptor and the service differentiator, the application descriptor and the service differentiator being in parallel (or separate), and both belonging to a traffic descriptor; alternatively, the route selection policy rule includes an application descriptor and the service differentiator is located in the application descriptor. The traffic descriptor may include the service differentiator and the application descriptor, or may include the service differentiator but not include the application descriptor, or may include the application descriptor but not include the service differentiator.

In an optional embodiment, the route selection policy rule further includes: a valid time and/or a valid location;

the processing module 740 is configured to perform the route selection policy rule in a case that the traffic of the application matches at least one criterion or criteria in a traffic descriptor in the route selection policy rule and a current location belongs to the valid location;

the processing module 740 is configured to perform the route selection policy rule in a case that the traffic of the application matches at least one criterion or criteria in a traffic descriptor of the route selection policy rule and a current time belongs to the valid time; and/or the processing module 740 is configured to perform the route selection policy rule in a case that the traffic of the application matches at least one criterion or criteria in a traffic descriptor in the route selection policy rule, a current time belongs to the valid time and a current location belongs to the valid location.

The processing module 740 is configured to delete the route selection policy rule in a case that a current time does not belong to the valid time or a current location does not belong to the valid location; alternatively, the processing module 740 is configured to deactivate the route selection policy rule in a case that a current time does not belong to the valid time or a current location does not belong to the valid location.

The foregoing mainly describe the solutions provided in the example embodiments of the disclosure from a perspective of an interaction between the network-side network element and the terminal. It may be understood that, to implement the foregoing solutions, the network-side network element and the terminal include a corresponding hardware structure and/or software modules for performing the functions of the solutions. Units and algorithm operations in the examples described with reference to the embodiments disclosed in the disclosure may be implemented by hardware or a combination of hardware and computer software in embodiments of the disclosure. Whether a function is performed by hardware or computer software driving hardware depends on particular applications and design constraints of the technical solutions. A person skilled in the art may use different methods to implement the described functions for each particular application, and these different methods to implement the described functions are within the scope of the technical solutions of the embodiments of the disclosure.

Figure 8:
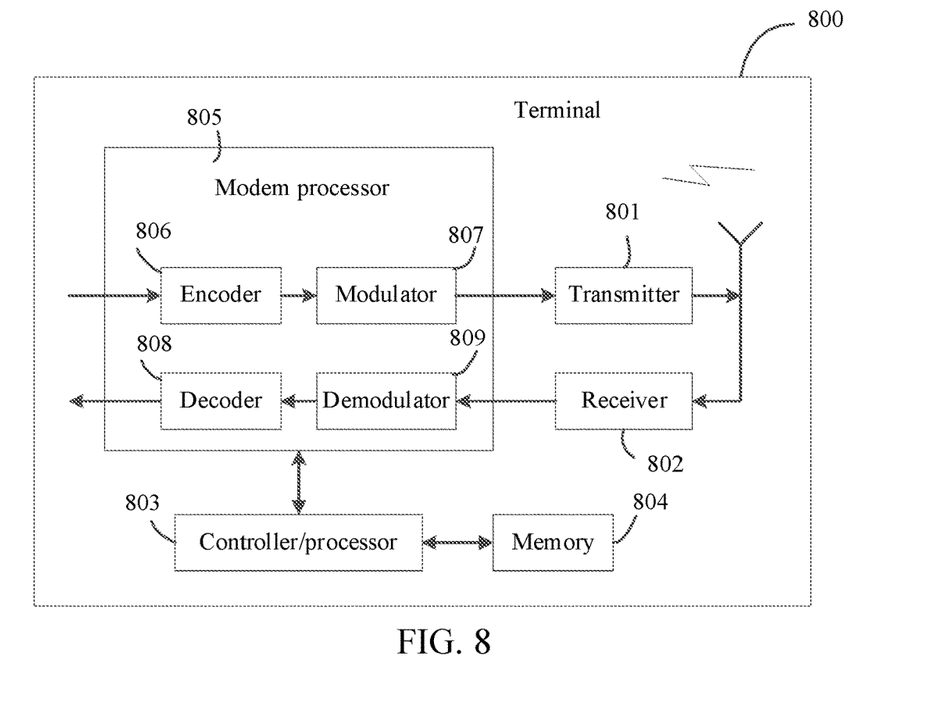
FIG. 8 is a structural block diagram of a terminal according to an example embodiment of the disclosure.

FIG. 8 is a schematic structural diagram of a terminal according to an example embodiment.

The terminal 800 includes a transmitter 801, a receiver 802 and a processor 803. The processor 803 may also be a controller, and is represented as "controller/processor 803" in FIG. 8. Optionally, the terminal 800 may further include a modem processor 805. The modem processor 805 may include an encoder 806, a modulator 807, a decoder 808, and a demodulator 809.

In an example, the transmitter 801 adjusts an output (for example, performs analog conversion, filtering, amplification, and up-conversion on the output) and generates an uplink signal, the uplink signal being transmitted to the network-side network element in the foregoing embodiment through an antenna. In a downlink, the antenna receives a downlink signal transmitted by the network-side network element in the foregoing embodiment. The receiver 802 adjusts (for example, filters, amplifies, down-converts, and digitizes) the signal received from the antenna and provides an input. In the modem processor 805, the encoder 806 receives service data and signaling messages that are to be transmitted on the uplink, and processes (for example, performs formatting, encoding, and interleaving on) the service data and signaling messages. The modulator 807 further processes (for example, performs symbol mapping and modulation on) the encoded service data and signaling messages and provides the output. The demodulator 809 processes (for example, demodulates) the output and provides symbol estimation. The decoder 808 processes (for example, de-interleaves and decodes) the symbol estimation and provides the decoded data and signaling messages that are transmitted to the terminal 800. The encoder 806, the modulator 807, the demodulator 809, and the decoder 808 may be implemented by a synthesized modem processor 805. The units are processed according to a wireless access technology adopted by a wireless access network (for example, the access technology of LTE and other evolved systems). When the terminal 800 does not include the modem processor 805, the foregoing functions of the modem processor 805 may also be performed by the processor 803.

The processor 803 controls and manages actions of the terminal 800, and is configured to perform a processing procedure performed by the terminal 800 in the foregoing embodiments of the disclosure. For example, the processor 803 is further configured to perform each operation on a terminal side in the foregoing method embodiment, and/or other operations of the technical solutions described in the embodiments of the disclosure.

Further, the terminal 800 may further include a memory 804, the memory 804 being configured to store program code and data that are for the terminal 800.

It may be understood that FIG. 8 shows only a simplified or schematic configuration of the terminal 800. In an actual application, the terminal 800 may also include any quantity of transmitters, receivers, processors, modem processors and memories, and all terminals that may implement the embodiments of the disclosure are within the protection scope of the embodiments of the disclosure.

Figure 9:
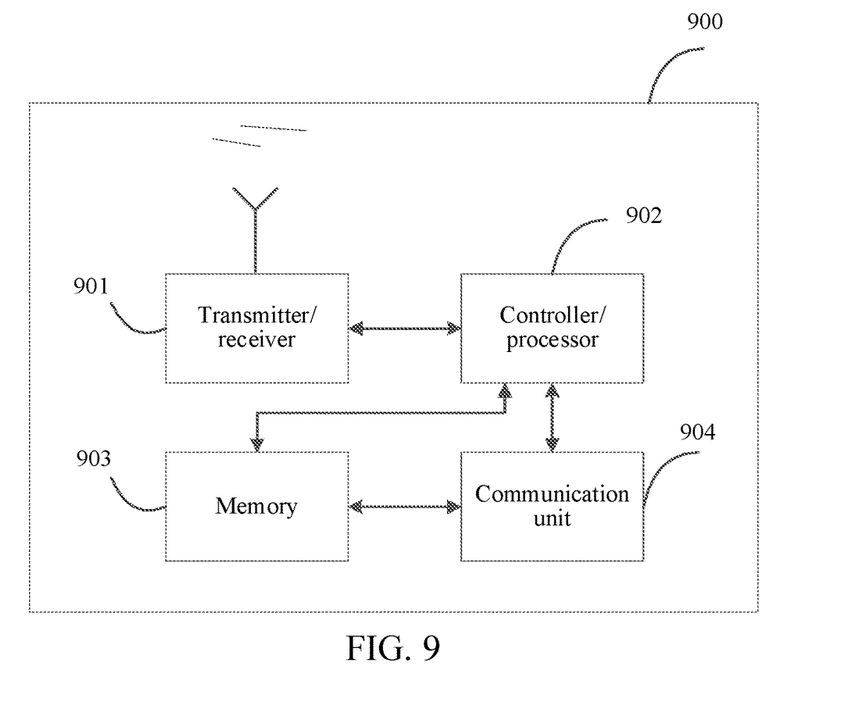
FIG. 9 is a structural block diagram of a network-side network element (an application function (AF) network element or a policy control function (PCF) network element) according to an example embodiment of the disclosure.

FIG. 9 is a schematic structural diagram of a network-side network element according to an example embodiment. The network-side network element may be an AF network element, or may be alternatively a PCF network element.

The network-side network element 900 includes a transmitter/receiver 901 and a processor 902. The processor 902 may also be a controller, and is represented as "controller/processor 902" in FIG. 9. The transmitter/receiver 901 is configured to support transmitting and receiving of information between the network-side network element and the terminal in the foregoing embodiments, and support communication between the network-side network element and other network entities. The processor 902 performs various functions for communicating with the terminal. In an uplink, an uplink signal from the terminal is received through an antenna, demodulated (for example, a high-frequency signal is demodulated into a baseband signal) by the receiver 901, and further processed by the processor 902 to restore service data and signaling messages that are transmitted by the terminal. In a downlink, the service data and signaling messages are processed by the processor 902, modulated by the transmitter 901 (for example, a baseband signal is modulated into a high-frequency signal) to generate a downlink signal, and transmitted to the terminal through the antenna. The foregoing demodulation or modulation function may also be performed by the processor 902. For example, the processor 902 is further configured to perform each operation on an AF network element side or a PCF network element side in the foregoing method embodiment, and/or other operations of the technical solutions described in the embodiments of the disclosure.

Further, the network-side network element 900 may further include a memory 903, the memory 903 being configured to store program code and data that are for the network-side network element 900. In addition, the network-side network element 900 may further include a communication unit 904. The communication unit 904 is configured to support the network-side network element 900 to communicate with other network entities (for example, network devices in a core network).

It may be understood that FIG. 9 shows only a simplified design of the network-side network element 900. In an actual application, the network-side network element 900 may include any quantity of transmitters, receivers, processors, controllers, memories, and communication units, and all network-side network elements that may implement the embodiments of the disclosure are within the protection scope of the embodiments of the disclosure.

An embodiment of the disclosure further provides a non-temporary computer-readable storage medium, storing a computer program, the computer program, when executed by a processor of a network-side network element, implementing the method for obtaining a route selection policy for a network-side network element side described above.

An embodiment of the disclosure further provides a non-temporary computer-readable storage medium, storing a computer program, the computer program, when executed by a processor of a terminal, implementing the method for performing a route selection policy rule for a terminal side described above.

An embodiment of the disclosure further provides a computer program product, storing a computer program, the computer program, when executed by a processor of a network-side network element, implementing the method for obtaining a route selection policy for an AF network element side or a PCF network element side described above.

An embodiment of the disclosure further provides a computer program product, storing a computer program, the computer program, when executed by a processor of a terminal, implementing the method for performing a route selection policy rule for a terminal side described above.

The sequence numbers of the foregoing embodiments of the disclosure are merely for description purpose but do not indicate the preference of the embodiments.

A person of ordinary skill in the art may understand that all or some of the operations of the foregoing embodiments may be implemented by using hardware, or may be implemented by a program instructing relevant hardware. The program may be stored in a computer-readable storage medium. The storage medium may be a ROM, a magnetic disk, an optical disc, or the like.

The technical features in the foregoing embodiments may be randomly combined. For concise description, not all possible combinations of the technical features in the embodiment are described. However, provided that combinations of the technical features do not conflict with each other, the combinations of the technical features are considered as falling within the scope recorded in this specification.

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the block diagrams, communication between the components, elements or units may be performed through the bus. Functional aspects of the above example embodiments may be implemented in algorithms that execute on one or more processors. Furthermore, the components, elements or units represented by a block or processing operations may employ any number of related art techniques for electronics configuration, signal processing and/or control, data processing and the like.

The foregoing embodiments only describe several implementations of the disclosure, which are described specifically and in detail, and therefore cannot be construed as a limitation to the patent scope of the disclosure. A person of ordinary skill in the art may further make variations and improvements without departing from the ideas of the disclosure, which all fall within the protection scope of the disclosure. Therefore, the protection scope of the disclosure is subject to the protection scope of the appended claims.

What is claimed is:

1. A method for obtaining a route selection policy, performed by a policy control function network element comprising at least one processor, the method comprising:
   generating a route selection policy rule for routing a traffic of an application executed by a terminal, the application being configured to provide a plurality of user services on the terminal, the plurality of user services being of different service types;
   transmitting an application function response to an application function network element after generation of the route selection policy rule; and
   providing, to the terminal, the route selection policy rule,
   wherein the route selection policy rule comprises a valid time and a valid location, the valid time representing a time at which the route selection policy rule is applicable, and the valid location representing a geographical location at which the route selection policy rule is applicable,
   wherein the route selection policy rule further comprises an application descriptor, the application descriptor comprising an operating system identifier and an application identifier, and
   wherein the application descriptor further comprises a service differentiator, the service differentiator being used for identifying a type of a user service, among the different service types of the plurality of user services of the application, provided by the traffic of the application executed by the terminal.

2. The method according to claim 1, wherein the providing the route selection policy rule comprises providing, to the terminal, the route selection policy rule, upon which routing of a traffic, of which a service type matches the type of the user service indicated by the service differentiator in the terminal, is controlled based on the route selection policy rule.

3. The method according to claim 1, wherein the route selection policy rule further comprises the application descriptor and the service differentiator, the service differentiator being not located in the application descriptor.

4. The method according to claim 1, further comprising:
   receiving an application function request from the application function network element, the application function request being used for requesting to generate the route selection policy rule.

5. The method according to claim 4, wherein the generating the route selection policy rule comprises at least one of:
   generating the route selection policy rule according to the application function request;
   generating the route selection policy rule according to a local policy; or
   generating the route selection policy rule according to the application function request and the local policy.

6. The method according to claim 1, wherein the route selection policy rule further comprises: a terminal identifier or a terminal group identifier.

7. The method according to claim 6, wherein the providing the route selection policy rule to the terminal comprises:
   providing the route selection policy rule to the terminal corresponding to the terminal identifier or the terminal group identifier.

8. An apparatus for obtaining a route selection policy, comprising:
   at least one memory configured to store program code; and
   at least one processor configured to read the program code and operate as instructed by the program code, the program code comprising:
   generation code configured to cause at least one of the at least one processor to generate a route selection policy rule for routing a traffic of an application executed by a terminal, the application being configured to provide a plurality of user services on the terminal, the plurality of user services being of different service types;
   transmission code configured to cause at least one of the at least one processor to transmit an application function response to an application function network element after generation of the route selection policy rule; and
   provision code configured to cause at least one of the at least one processor to provide, to the terminal, the route selection policy rule,
   wherein the route selection policy rule comprises a valid time and a valid location, the valid time representing a time at which the route selection policy rule is applicable, and the valid location representing a geographical location at which the route selection policy rule is applicable,
   wherein the route selection policy rule further comprises an application descriptor, the application descriptor comprising an operating system identifier and an application identifier, and
   wherein the application descriptor further comprises a service differentiator, the service differentiator being used for identifying a type of a user service, among the different service types of the plurality of user services of the application, provided by the traffic of the application executed by the terminal.

9. The apparatus according to claim 8, wherein the provision code is further configured to cause at least one of the at least one processor to provide, to the terminal, the route selection policy rule, upon which routing of a traffic, of which a service type matches the type of the user service indicated by the service differentiator in the terminal, is controlled based on the route selection policy rule.

10. The apparatus according to claim 8, wherein the route selection policy rule further comprises the application descriptor and the service differentiator, the service differentiator being not located in the application descriptor.

11. The apparatus to claim 8, wherein the program code further comprises:
receiving code configured to cause at least one of the at least one processor to receive an application function request from the application function network element, the application function request being used for requesting to generate the route selection policy rule.

12. The apparatus according to claim 11, wherein the generation code is further configured to cause at least one of the at least one processor to generate at least one of:
the route selection policy rule according to the application function request; the route selection policy rule according to a local policy; or the route selection policy rule according to the application function request and the local policy.

13. The apparatus according to claim 8, wherein the route selection policy rule further comprises: a terminal identifier or a terminal group identifier.

14. The apparatus according to claim 13, wherein the provision code is further configured to cause at least one of the at least one processor to provide the route selection policy rule to the terminal corresponding to the terminal identifier or the terminal group identifier.

15. A non-transitory computer-readable storage medium, storing computer-readable program instructions, the computer-readable program instructions being executable by at least one processor to perform:
generating a route selection policy rule for routing a traffic of an application executed by a terminal, the application being configured to provide a plurality of user services on the terminal, the plurality of user services being of different service types;
transmitting an application function response to an application function network element after generation of the route selection policy rule; and
providing, to the terminal, the route selection policy rule,
wherein the route selection policy rule comprises a valid time and a valid location, the valid time representing a time at which the route selection policy rule is applicable, and the valid location representing a geographical location at which the route selection policy rule is applicable,
wherein the route selection policy rule further comprises an application descriptor, the application descriptor comprising an operating system identifier and an application identifier, and
wherein the application descriptor further comprises a service differentiator, the service differentiator being used for identifying a type of a user service, among the different service types of the plurality of user services of the application, provided by the traffic of the application executed by the terminal.

16. The method according to claim 1, wherein the plurality of user services are in one-to-one correspondence with the different service types.

17. The method according to claim 1, wherein the service differentiator comprises at least one of a number, a character, or a symbol that is used to describe the type of the user service.

18. The method according to claim 4, wherein the application function request includes the type of the user service to be provided by the traffic of the application executed by the terminal.

\* \* \* \* \*